United States Patent Office 3,433,263
Patented Mar. 18, 1969

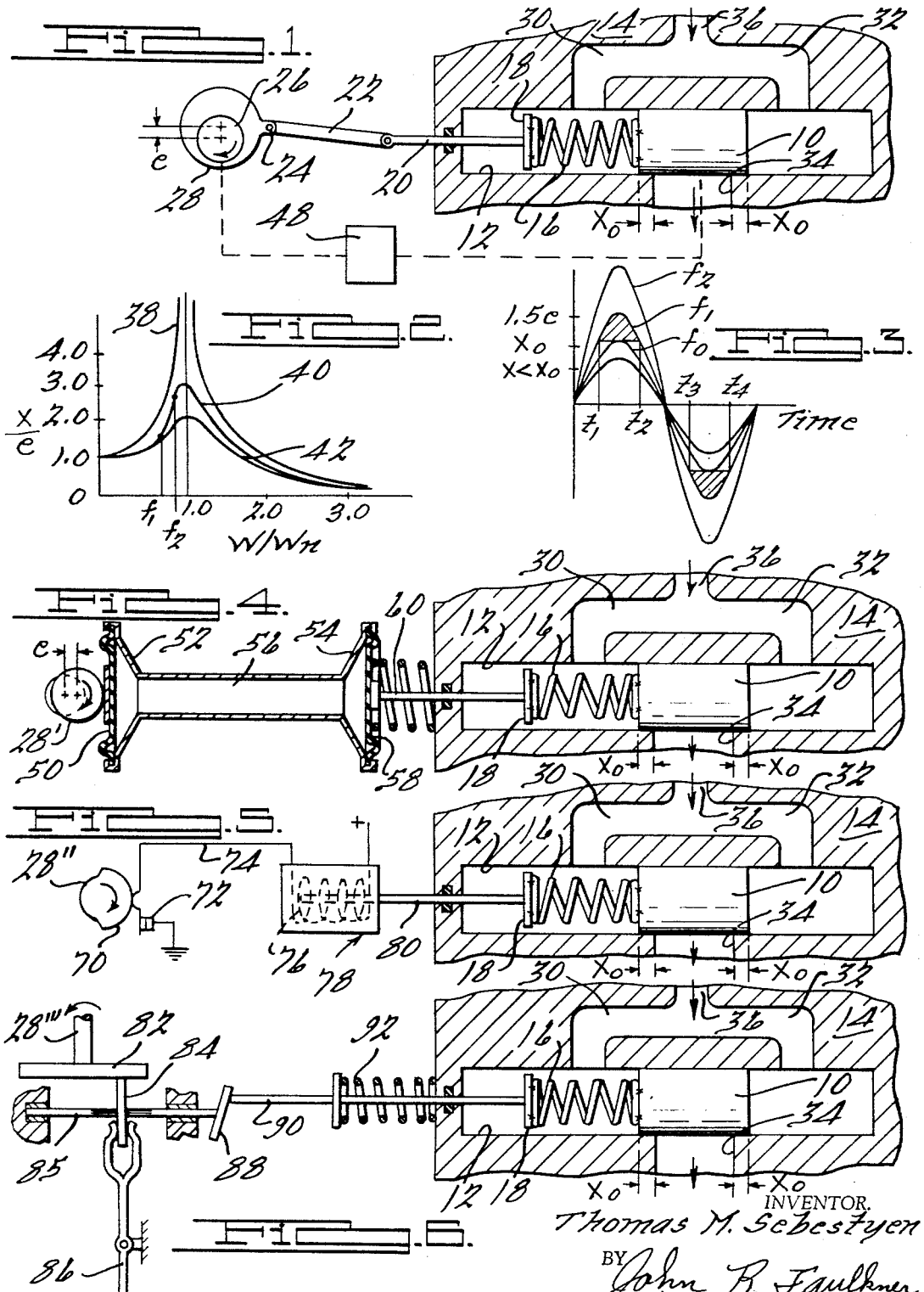

3,433,263
SPEED LIMITING DEVICE
Thomas M. Sebestyen, Ann Arbor, Mich., assignor to Ford Motor Company, Dearborn, Mich., a corporation of Delaware
Filed Mar. 30, 1967, Ser. No. 627,167
U.S. Cl. 137—624.15                     11 Claims
Int. Cl. F15c 3/02

ABSTRACT OF THE DISCLOSURE

A rotating shaft has an eccentric providing an input pulse of a constant magnitude to a spring-mass system, the mass being a valve that oscillates with an amplitude that varies as a function of the change in frequency of the input to variably control the rise in fluid pressure in a port, the attainment of a predetermined pressure level in the port operatively inhibiting the speed of the rotating shaft beyond a selected level.

---

This invention, in general, relates to a fluid pressure signal generator. More particular, in its preferred embodiment, the invention relates to a speed limiting device.

One of the objects of the invention is to provide an inexpensive means for limiting the speed of a rotary member.

Another object of the invention is to provide a simple, tuned spring-mass system that produces a predetermined fluid pressure signal force in response to the attainment of a predetermined frequency of oscillation of a member to limit the speed of the member.

Other objects, features and advantages of the invention will become apparent upon reference to the succeeding detailed description thereof, and to the drawings illustrating the preferred embodiments thereof, wherein:

FIGURE 1 illustrates, schematically, a cross-sectional view of a speed limiting device embodying the invention;

FIGURE 2 is a graph showing, for various damping factors, the changes in amplitude oscillation of the mass of a tuned spring-mass system as the frequency oscillation of the driving member approaches and passes the natural frequency of the system;

FIGURE 3 is a graph illustrating the time of, and duration of, opening of a fluid pressure port shown in FIGURE 1, with changes in the frequency of the pulse generator shown in FIGURE 1; and FIGURES 4, 5 and 6 illustrate other embodiments of the invention.

As described previously, a principal object of the invention is to provide an inexpensive speed limiting device, which, in this case, consists of a simple tuned spring-mass system. More specifically, as seen in FIGURE 1, the spring-mass system per se includes a shuttle type valve 10 of a suitable mass reciprocably mounted in a bore 12 provided in a valve body 14. A flexible controlled rate spring 16 is secured at one end to the valve and at its other end to a base member 18 of suitable mass. The base member is secured to a stem link 20 that projects sealingly through one end of bore 12. Link 20, in turn, is pivotally connected by a push-pull link 22 to a throw arm 24 pivotally secured to an eccentric 28. The eccentric is fixedly mounted on the rotary member or shaft 26, the rotation of which is to be controlled. The eccentric generates a constant magnitude impulse or signal having a displacement or amplitude indicated by $e$.

Bore 12 has two fluid inlets 30 and 32, and an outlet 34. The inlets are branches of a main line 36 that is adapted to be connected to any suitable source of fluid under pressure, not shown. The outlet 34 is normally covered by valve 10 in the rest position shown. For a purpose to be described later, the diameter of bore 12 is slightly less than the axial length of valve 10 minus the amplitude $e$ due to the eccentric mount. That is, $X_0$ is slightly larger than $e$.

From the above, it will be clear that a variable frequency pulse generator is provided that generates a constant magnitude signal that is imposed on spring 16. The attached valve mass 10 will then oscillate with an amplitude that varies as a function of the natural frequency of the system and the level of damping.

More specifically, FIGURE 2 illustrates the change in the frequency oscillation of the driving member 26, for different damping factors. The vertical axis represents the changes in the ratio of the amplitude of valve mass 10 over the constant eccentric amplitude $e$. The horizontal axis represents the change in ratio of the frequency of the driving member 28 compared to the natural frequency of the spring-mass system. Damping of the movement of valve mass 32 in this instance is provided by a selective choice of the viscosity of the fluid in inlet line 36, and by controlling the fluid film thickness and tolerances or fit between valve mass 10 and the bore 12. The various curves 38, 40 and 42 represent the changes with no damping (38) and increased damping (40 and 42).

At low frequencies of oscillation of link 22, it will be clear that the constant magnitude impulses imparted to the spring-mass system will cause the push-pull linkage and spring and valve mass to move essentially as a unit and reciprocate the valve mass back and forth. This latter condition is shown in FIGURE 2 near the vertical axis, where a unitary displacement of all of the members is indicated. It can be seen that, without damping, or damping that is essentially zero (curve 38), as the input frequency increases and approaches the natural frequency of the spring-mass system, represented at 1.0 on the horizontal scale, the amplitude of oscillation of valve mass 10 increases toward infinity. It will also be seen that by introducing a controlled damping into the system, indicated by curves 40 and 42, that the amplitude of oscillation of valve 10 can be controlled so as not to exceed a predetermined valve when the frequency of the impulse generator equals the natural frequency of the system. That is, the valve mass will have a maximum amplitude, indicated by the flat upper portion of each of the curves 40 and 42 in FIGURE 2.

The above phenomenon is utilized to provide a controlled uncovering of outlet port 34 in FIGURE 1 to thereby generate a fluid pressure signal in outlet 34 that is used to control or prevent the speed (frequency) of shaft 26 from increasing further.

More specifically, FIGURE 3 shows the period of oscillation of the spring-mass system and indicates the change in the amplitude X of the valve mass 10 as a function of time and change in the frequency ($f_0$, $f_1$, $f_2$) of driving member 28, with controlled damping.

In this case, the vertical axis represents the increase in the amplitude X of the valve 10 with increases in the speed (frequency) of shaft 28, and changes in time. As stated previously, when the driving member 28 oscillates the valve mass 10 at a low frequency, say, $f_0$, the amplitude X of the valve mass is less than the distance $X_0$ indicated in FIGURE 1. Therefore, outlet port 34 will not be uncovered at this frequency. As the frequency increases to the value, say, $f_1$ (see also FIGURE 2), the amplitude X increases past the magnitude $e$. Outlet port 34 now opens at the point $t_1$ in time and remains open until the point $t_2$ in time is reached. The change in the amplitude of valve mass 10, and the duration of opening of outlet 34 is indicated by the shaded portion in FIGURE 3 between curves $f_1$ and $f_0$. This, of course, is repeated during the negative half cycle of the period of oscillation of the spring mass system, between the times $t_3$ and $t_4$.

As the frequency of the driving member increases further to the value $f_2$, it will be seen that the amplitude X of valve mass 10 increases further, the port 34 opens sooner, and stays open longer. Thus, it will be seen that the fluid pressure in outlet 34 will increase as a function of the change in frequency (for a given damping factor). Therefore, it now is a relatively simple matter to control the speed of shaft 28 merely by directing the pressure of the fluid in outlet 34 to some suitable control that is activated at a predetermined pressure level either to brake shaft 28 or otherwise limit its speed. For example, the pressure could trip a set of electrical contacts, contained in a box 48 that would open at a predetermined outlet fluid pressure, to break the drive to shaft 28 or send a signal to a fuel control. Alternatively, the box could contain a friction brake that would be actuated by a predetermined pressure of the fluid in outlet 34 to brake the speed of shaft 28.

In operation, therefore, assume that the frequency of the driving member 26 to be controlled is at say the $f_1$ level, and that it is desired that the speed of the driving member 28 not go beyond this point. Therefore, as shaft 28 rotates, a pulse will be generated through linkage 22 to the spring 16 and valve mass 10 to oscillate the valve with a maximum amplitude corresponding to that indicated by the curve $f_1$ in FIGURE 3, and equal, for example, to one and one-half times the amplitude $e$. When the frequency reaches the level $f_1$, the output port 34 will open at the time $t_1$ and remain open to the time $t_2$, thereby generating a predetermined fluid pressure signal force in outlet line 34. If the frequency of the member should increase beyond the desired value towards the level $f_2$, the fluid pressure in outlet 34 will also increase. This will be directed to the speed limiting or shut down device 48 to brake the speed of rotating shaft 28, or alternately, actuate a circuit breaker or switch to shut down the drive of shaft 28.

It will thus be seen that the invention provides a simple and an inexpensive speed limiter.

The constant magnitude input frequency can be generated and transmitted in a variety of ways. FIGURE 1 illustrates a purely mechanical system. FIGURES 4, 5 and 6 illustrate, respectively, fluid, electrical, and infinitely variable controls.

FIGURE 4, for example, utilizes a fluid pulse generator to provide the input signal to the tuned spring-mass system. More specifically, the rotating shaft 28' to be controlled has an eccentric 26' mounted to act against a flexible diaphragm 50 that is mounted across the end of a fluid chamber represented schematically by the numeral 52. Chamber 52 is connected to a similar fluid chamber 54 by a conduit 56, the chamber 54 also having a flexible diaphragm 58 sealing the open end of the chamber. Diaphragm 58 has a stem actuator 60 projecting into the bore 12, where it is secured to the spring member 16. The two diaphragms in fluid chambers 52 and 54, in this case, constitute leader and slave members, oscillation of the driving member 28' moving diaphragm 50 to force fluid through line 56 and move diaphragm 58 to the right to thus impart a pulse of a constant magnitude to the spring-mass system.

FIGURE 5 shows the use of a circuit breaker and a solenoid to provide the pulse input to the spring-mass system. In this case, the shaft 26" to be controlled includes a cam portion 70 that reacts with a pair of switch contacts 72. The contacts are connected by a line 74 to the coils 76 of a solenoid 78 that is connected to any suitable source of power, not shown. The armature 80 of the solenoid would be surrounded by coils 76 and would move rightwardly in a known manner when energized upon closing of contacts 72 by cam 70. Again, this will provide the oscillating force necessary to provide the pulse input to the tuned spring-mass system.

FIGURE 6 illustrates a further modification in which an infinitely variable control of the speed of the driving member can be provided. In this case, the driving shaft 26''' has a friction driving disc 82 frictionally engaging a friction driving disc 82 frictionally engaging a disc 84, at one point on its radius, to drive the disc 84 at a predetermined speed change. The disc 84 is axially slidably mounted on a shaft 85, and is moved axially by a pivotally mounted speed selector or lever 86, to any number of radial positions to vary the speed or rotation of disc 84. A known type of wobble plate 88 is connected to the end of shaft 85, and drives or oscillates a plunger 90 fixedly connected to the end of spring 16. A suitable return spring 92 urges the plunger 90 in the opposite direction.

In operation, assume shaft 26''' is to be controlled at a certain speed level. With the disc 84 positioned radially as shown, a predetermined pressure level will be produced in outlet 34 when the desired frequency is reached. By moving the selector lever 86 to reposition disc 84 radially, the speed of shaft 26''' can be controlled at various levels. That is, a change in the position of disc 84 will increase or decrease the speed of wobble plate 88 relative to that of shaft 26''', and thus cause the predermined pressure level in outlet 34 to be reached sooner or later, as the case may be, than for the previous setting. Thus the shaft 26''', can be braked at a lower or higher speed level.

It will be clear, therefore, that an infinite number of speed level controls of the speed on shaft 26''', will be provided merely by changing the position of the speed selector lever 86.

While the invention has been shown and described in the preferred embodiments, it will be clear to those skilled in the arts to which it pertains that many changes and modifications may be made thereto without departing from the scope of the invention.

I claim:

1. A fluid pressure signal producing device comprising, in combination, a variable frequency constant magnitude pulse generator, a tuned spring-mass system operably connected to said generator for oscillation of said mass in response to the pulses of said generator, a fluid inlet containing a source of fluid under pressure, a fluid outlet, said mass being reciprocably mounted in conduit means to normally block said outlet and operably movable by the impulses of said generator in response to the attainment of predetermined frequencies of said impulses to positions variably opening said outlet, spring means operably connecting said generator and mass for transmitting the pulse of said generator to said mass for movement thereof, and means operably connecting the fluid in said outlet to said generator for preventing overspeed of said generator in response to a predetermined fluid pressure of the fluid in said outlet.

2. A speed limiting device as in claim 1, said mass comprising a fluid flow regulating valve.

3. A speed limiting device as in claim 1, said generator comprising an eccentrically mounted rotatable member.

4. A speed limiting device as in claim 3, said outlet having an opening slightly less in diameter than the length of said valve minus the displacement caused by the eccentricity of said generator.

5. A speed limiting device as in claim 1, said means operably connecting said generator and spring including a fluid pressure pulse device.

6. A speed limiting device as in claim 5, said device comprising a pair of movable diaphragm members operably movable in interconnected fluid chambers, said generator operably engaging one of said diaphragm members, the other of said members being operably connected to said spring, whereby movement of one diaphragm member by said generator transmits said movement through said fluid in said chambers to the other of said members and to said spring.

7. A speed limiting device as in claim 1, said means operably connecting said generator and said spring comprising solenoid means having contacts alternately open and closed by rotation of said generator, and armature means in said solenoid connected to said spring and reciprocatable upon energization and de-energization of said solenoid in response to the opening and closing of said contacts by said generator.

8. A speed limiting device as in claim 1, said generator comprising an infinitely variable speed device having means movable to vary the input speed of said device.

9. A speed limiting device as in claim 1, including damping means to prevent movement of said valve beyond a maximum amplitude.

10. A device as in claim 1, said mass comprising a shuttle type valve.

11. A device as in claim 10, said conduit means including branches connecting the fluid under pressure in said inlet to opposite ends of said valve and to said outlet past said valve when said valve is in its alternate outlet opening positions.

References Cited

UNITED STATES PATENTS

| | | | |
|---|---|---|---|
| 2,942,589 | 6/1960 | Wacker | 123—7 |
| 2,981,286 | 4/1961 | Smith | 137—624.17 |
| 3,347,252 | 10/1967 | Hanson | 137—624.15 |

MILTON O. HIRSHFIELD, *Primary Examiner.*

B. A. REYNOLDS, *Assistant Examiner.*

U.S. Cl. X.R.

310—18